United States Patent Office 2,989,487
Patented June 20, 1961

2,989,487
COORDINATION POLYMERIZATION CATALYSTS
William Lawrence Truett, Wilmington, Del., assignor to E. I. du Pont de Nemours and Company, Wilmington, Del., a corporation of Delaware
No Drawing. Filed Sept. 17, 1958, Ser. No. 761,459
6 Claims. (Cl. 252—431)

This invention relates to novel catalyst systems which are highly valuable for the production of solid ethylene polymers and to a process using these novel catalysts in the polymerization of ethylene. This application is a continuation-in-part of copending application Serial No. 455,769, filed September 13, 1954, now Patent No. 2,899,415.

In accordance with the present invention, it has been discovered that aluminum halides react with organometallic compounds having at least one metal-to-hydrocarbon bond to form products which are highly active in catalyzing the polymerization of ethylene to high molecular weight, linear polyethylenes.

The catalytic activity of the reaction products of aluminum halide and organometallic compounds is believed to reside in their ability to coordinate with ethylenically unsaturated compounds, such as ethylene and as a result thereof, cause the formation of high molecular weight polymers. In view of this reaction mechanism the catalysts obtained by the present invention are referred to as "coordination catalysts." The aluminum halides which are active in the formation of these novel catalysts are aluminum chlorides, aluminum bromides, aluminum iodides and aluminum fluorides. The aluminum halides may be of commercial grade or may be technically pure. The organometallic compounds employed in the formation of the novel catalysts of the present invention are as stated hereinabove, organometallic compounds having at least one metal-to-hydrocarbon bond. These compounds may be defined as having the general formula $RMX_{n-1}$ wherein R is a hydrocarbon radical, M a metal or a combination of metals and X a hydride, halide or other radical, including a hydrocarbon radical, and $n$ is the valence of the metal. Particularly preferred organometallic compounds are those in which the metal is bonded exclusively to hydrocarbon radicals such as metal alkyls and metal aryls. However, alkyl metal halides, aryl metal halides, alkyl metal hydrides, aryl metal hydrides, and similar compounds are also suitable in the formation of the novel catalysts of the present invention. The size of the hydrocarbon radical, i.e., the number of carbon atoms in the hydrocarbon radical, is not critical, and hydrocarbon radicals having from one to twenty carbon atoms are readily employed in the formation of the catalyst. The metal of the organometallic compound is one which forms stable organometallic compounds and thus excludes the transition metals in general, and is found in groups I-A to IV-A (inclusive) of the periodic table of elements, as described in the Handbook of Chemistry and Physics (Chemical Rubber Publishing Co. 37th Ed., page 392). The organometallic compounds preferably employed in the process of the present invention are organometallic compounds of alkali metals, alkaline earth meals, aluminium, cadmium, mercury, tin and lead. Particularly active catalysts are obtained with tetravalent organometallic compounds such as lead tetraalkyls, lead tetraaryls, tin tetraalkyls, tin tetraaryls, alkali metal aluminum tetraalkyls, and alkali metal aluminum tetraaryls. Specific examples of organometallic compounds which are useful in the formation of the catalysts of the present invention are dodecyl sodium, isoamyl sodium, butyl lithium, phenyl lithium, benzyl potassium, ethyl potassium, dibutyl magnesium, dimethyl beryllium, diisoamyl zinc, diphenyl zinc, diethyl cadmium, diphenyl mercury, dipropyl mercury, methylethyl mercury, triisobutyl aluminum, lithium aluminum tetraethyl, sodium aluminum tetradecyl, tetraisoamyl lead, tetratoluyl lead, methyltriethyl tin, tetrabutyl tin, tetraphenyl tin, and diphenyldiethyl tin. Examples of organometallic compounds which contain a halide radical include Grignard reagents, alkyl zinc halides, alkyl aluminum halides, aryl tin halides and similar compounds. Similarly, alkyl and aryl metal hydrides may be employed in the formation of the catalysts of the present invention.

The catalyst is formed by simply mixing the two components in an inert atmosphere. The reaction of the catalyst components with each other to form the reactive catalyst system is very rapid and occurs readily at room temperature. The catalytic activity of the catalysts can, however, be improved by forming the catalyst in the presence of an inert hydrocarbon solvent, such as hexane, heptane, cyclohexane, benzene, toluene, etc. It is furthermore preferred to employ the catalyst components in the form of a solution or in finely divided form in the inert organic solvent. The catalytically reactive product is formed whenever the catalyst components are admixed, and is independent of the quantities of the catalyst components employed. However, in order to obtain maximum catalytic activity from the reaction product, it is preferred to employ molar ratios of organometallic compound to aluminum halide of 0.1 to 10 in the formation of the catalyst of the present invention.

Catalysts prepared by the above-described methods are extremely active in the polymerization of ethylene and are capable of forming high molecular weight polyethylene at moderate temperatures and moderate pressures. The polymerization may therefore be carried out at temperatures ranging from 0° to 250° C. and pressures from 1 atmosphere to 200 atmospheres. If desired, higher or lower pressures may be employed. Preferred temperatures are within the range of 75° to 150° C. The quantity of catalyst employed will vary in accordance with polymerization techniques heretofore developed and generally ranges from .001% to 10% on the basis of the monomer employed.

The invention is further illustrated by means of the following examples:

*Example I*

A solution of 0.03 mole of aluminum trichloride and 200 ml. of cyclohexane was heated to 50° to 55° C. and 0.03 mole of an ethereal solution of ethyl magnesium bromide was added rapidly under a blanket of nitrogen. The mixture was shaken for several minutes and was introduced into a 325 ml. stainless steel shaker tube. After flushing with nitrogen and evacuating, the tube was pressured up to 250 p.s.i. with ethylene and the mixture was shaken at 200 C. for 90 minutes. The reactor was cooled to room temperature and the solid reaction product filtered from the reaction mixture. The solid product was washed in a Waring Blendor with successive portions of acetone, methanol, hydrochloric acid in methanol and acetone, and then dried overnight in a 70° C. oven, yielding 1.4 grams of polyethylene, which was found to have a density of 0.045 g./cm.$^3$ and could be compression molded into tough films.

*Example II*

To 325 ml. stainless steel shaker tube was charged under nitrogen 100 ml. of toluene, 0.01 mole of aluminum trichloride and 0.02 mole of tin tetrabutyl. The vessel was evacuated and then pressured to 1000 p.s.i. with ethylene and heated to a temperature of 150° C. The vessel was agitated at that temperature and pressured for a period of 30 minutes and then heated to 250° C. and pressured to a pressure of 1100 p.s.i. with ethylene and there agitated for a period of 30 minutes. The shaker tube was then cooled to room temperature, excess ethylene removed, and the reaction mixture filtered. On repeatedly washing with acetone, methanol, and a hydrochloric acid-methanol mixture, there was obtained on drying 4.0 grams of polyethylene.

*Example III*

Into a 325 ml. stainless steel shaker tube was charged under nitrogen 200 ml. of cyclohexane, 0.01 mole of aluminum trichloride and 0.03 mole of tin tetrabutyl. The vessel was evacuated and the nitrogen replaced with ethylene. The reaction vessel was then heated to a temperature of 150° C. and pressured with ethylene to a pressure of 1000 p.s.i. While maintaining the temperature and pressure, the reaction mixture was agitated for a period of 60 minutes. On work-up of the product there was obtained 0.8 gram of polyethylene.

*Example IV*

Into a 325 ml. stainless steel shaker tube was charged under nitrogen 125 ml. of purified cyclohexane, 2.1 grams of aluminum trichloride, and 0.9 gram of tetraphenyl tin. Three ½ inch steel balls were added and the system was pressured to 15 p.s.i. with nitrogen. The temperature was increased to 70° C. and the system was agitated for one hour after which it was cooled to room temperature and pressured to 300 p.s.i. with ethylene. The temperature was then increased to 50° C. and maintained for two hours. The tube was then emptied and the reaction mixture filtered. On washing and drying there was obtained 0.6 gram of polyethylene from the filtered product.

*Example V*

Into a 325 ml. stainless steel shaker tube there was charged 150 ml. of toluene, 0.01 mole of aluminum tribromide, and 0.02 mole of tin tetraphenyl. The reaction mixture was heated to 120° C. and pressured with ethylene to a pressure of 1000 p.s.i. The reaction mixture was agitated at that pressure and temperature for a period of one hour. On removal of the reaction mixture from the reaction vessel, filtering the reaction mixture, washing and drying the isolated polymer, there was obtained 5.2 grams of high molecular weight polyethylene.

The examples have illustrated means of employing the novel catalysts of the present invention in the polymerization of ethylene. It is to be understood that the use of the catalysts of the present invention in the polymerization of ethylene is not limited to the conditions shown hereinabove. Similarly, the polymerization of ethylene is not limited to the specific catalyst species shown hereinabove. Thus active catalysts may also be formed when aluminum trifluoride is reacted with tetrabutyl tin, aluminum triiodide with tetraphenyl tin, aluminum trichloride and tetrapropyl lead, aluminum tribromide with dimethyl cadmium, aluminum trichloride with phenyl lithium, aluminum tribromide with diphenyl magnesium, particularly when compounds are employed in molar ratios of the aluminum halide to the organometallic compound of 0.1 to 10.

The catalyst components employed in the present invention need not be technically pure compounds. Similarly, it is not necessary for the ethylene to be technically pure. However, the catalyst is deleteriously affected by the presence of hydroxyl-groups containing compounds and oxygen. Hence it is desirable to carry out the polymerization of ethylene with the catalysts of the present invention in the absence of moisture and other hydroxyl-containing compounds and oxygen. Preferably the concentration of these compounds should not exceed 20 parts per million. The catalytic activity of the compounds of the present invention is greatly increased if the aluminum halide, prior to reaction with the organometallic compound, is reduced to a very fine particle size, and if the reaction product obtained after reaction of the aluminum halide with the organometallic compound is similarly reduced to a very fine particle size. This can be accomplished by means such as ball-milling a dispersion of aluminum chloride or employing a solution of aluminum chloride and ball-milling the reaction product of the aluminum halide with the organometallic component. A particularly preferred means of achieving high catalytic activity is subjecting the catalyst components both prior to and after the reaction to ultrasonic vibration.

The structure of the polyethylene made in accordance with the process of this invention is characterized by being a straight chain hydrocarbon with vinyl groups at one or both ends of at least some of the molecules and with a minimum of chain branching. The infra-red measurements of the polymer indicate very little methyl substitution and a small number of vinylidene groups with little or no trans-unsaturation or carbonyl groups.

The catalytic activity of the novel catalysts of the present invention is such that the catalysts are well suited for the copolymerization of ethylene with other ethylenically unsaturated compounds such as propylene, butene-1, butadiene, styrene, etc. The products obtained by polymerizing ethylene with the catalysts hereinabove disclosed are solid polymers and are not to be compared with the liquid polymers obtained heretofore by the use of Friedel-Crafts type of catalyst such as aluminum trihalides. The ethylene polymers obtained in accordance of this invention are valuable in many applications, especially in the preparation of films, molded articles, fibers, extruded insulation on wire, coating on solid substrates, etc.

I claim:

1. The catalyst composition comprising the reaction product obtained on admixing an alumium trihalide with an organomagnesium compound having at least one hydrocarbon bonded to magnesium in an inert organic solvent in molar ratios of .01 to 10.

2. The composition as set forth in claim 1 wherein the organomagnesium compound is an alkyl magnesium halide.

3. The composition as set forth in claim 1 wherein the organomagnesium compound is an aryl magnesium halide.

4. The catalyst as set forth in claim 3 wherein the alkyl magnesium halide is ethyl magnesium bromide.

5. A catalyst composition comprising the reaction product obtained on admixing an aluminum trihalide with a compound selected from the class consisting of organomagnesium compounds having at least one hydrocarbon group bonded to magnesium and tin tetrabutyl, in an inert organic solvent, in molar ratios of 0.1 to 10.

6. A catalyst composition comprising the reaction product obtained on admixing an aluminum trihalide with tin tetrabutyl in an inert organic solvent in molar ratios of 0.1 to 10.

References Cited in the file of this patent

UNITED STATES PATENTS

| | | |
|---|---|---|
| 2,786,035 | Freimiller et al. | Mar. 19, 1957 |
| 2,846,427 | Findlay | Aug. 5, 1958 |
| 2,900,374 | Aries | Aug. 18, 1958 |
| 2,898,330 | Isbenjian | Aug. 4, 1959 |
| 2,899,415 | Truett | Aug. 11, 1959 |

FOREIGN PATENTS

| | | |
|---|---|---|
| 534,792 | Belgium | Jan. 31, 1955 |
| 547,618 | Belgium | Nov. 7, 1956 |
| 1,134,740 | France | Dec. 3, 1956 |

OTHER REFERENCES

Chem. and Eng. News 36, No. 17, page 46 (April 28, 1958).

UNITED STATES PATENT OFFICE

CERTIFICATE OF CORRECTION

Patent No. 2,989,487　　　　　　　　　　　　　　June 20, 1961

William Lawrence Truett

It is hereby certified that error appears in the above numbered patent requiring correction and that the said Letters Patent should read as corrected below.

Column 1, line 61, for "meals" read -- metals --; column 2, line 60, for "0.045" read -- 0.945 --; column 4, line 38, for ".01" read -- 0.1 --; line 45, for the claim reference numeral "3" read -- 2 --.

Signed and sealed this 7th day of November 1961.

(SEAL)
Attest:

ERNEST W. SWIDER　　　　　　　　　　　　　　DAVID L. LADD
Attesting Officer　　　　　　　　　　　　　　Commissioner of Patents

USCOMM-DC